(12) United States Patent
Harville

(10) Patent No.: US 7,831,087 B2
(45) Date of Patent: Nov. 9, 2010

(54) METHOD FOR VISUAL-BASED RECOGNITION OF AN OBJECT

(75) Inventor: Michael Harville, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 960 days.

(21) Appl. No.: 10/698,111

(22) Filed: Oct. 31, 2003

(65) Prior Publication Data

US 2005/0094879 A1    May 5, 2005

(51) Int. Cl.
*G06K 9/00* (2006.01)
*G06K 9/62* (2006.01)

(52) U.S. Cl. .................. 382/154; 382/103; 382/209

(58) Field of Classification Search .............. 382/209, 382/103, 154
See application file for complete search history.

(56) References Cited

U.S. PATENT DOCUMENTS

| | | | | |
|---|---|---|---|---|
| 5,491,627 | A * | 2/1996 | Zhang et al. | 600/408 |
| 6,031,565 | A * | 2/2000 | Getty et al. | 348/56 |
| 6,115,052 | A * | 9/2000 | Freeman et al. | 345/473 |
| 6,681,031 | B2 * | 1/2004 | Cohen et al. | 382/103 |
| 6,771,818 | B1 * | 8/2004 | Krumm et al. | 382/225 |
| 6,909,792 | B1 * | 6/2005 | Carrott et al. | 382/128 |
| 6,990,233 | B2 * | 1/2006 | Park et al. | 382/164 |
| 7,003,136 | B1 * | 2/2006 | Harville | 382/103 |
| 7,035,433 | B1 * | 4/2006 | Mihara et al. | 382/107 |
| 7,181,056 | B2 * | 2/2007 | Campanini et al. | 382/132 |
| 2002/0028003 | A1 * | 3/2002 | Krebs et al. | 382/115 |
| 2002/0050924 | A1 * | 5/2002 | Mahbub | 340/426 |
| 2003/0108244 | A1 * | 6/2003 | Li et al. | 382/227 |
| 2003/0123713 | A1 * | 7/2003 | Geng | 382/118 |
| 2004/0017929 | A1 * | 1/2004 | Bramblet et al. | 382/103 |
| 2004/0037450 | A1 * | 2/2004 | Bradski | 382/103 |
| 2004/0189720 | A1 * | 9/2004 | Wilson et al. | 345/863 |
| 2004/0218788 | A1 * | 11/2004 | Geng | 382/118 |
| 2005/0093697 | A1 * | 5/2005 | Nichani et al. | 340/545.1 |

FOREIGN PATENT DOCUMENTS

JP    2003117009 A  *  4/2003

OTHER PUBLICATIONS

Hoogenraad, J.—"First results from the Philips Optical Mammoscope"—SPIE 1998, vol. 3194, pp. 184-190.*
Beymer, D.—"Person Counting Using Stereo"—2000 IEEE, pp. 127-133.*
Ismail Haritaoglu, et al.; "Ghost 3D: Detecting Body Posture and Parts Using Stereo"; 2002 IEEE Procedings of the Workshop on Motion and Video Computing (Motion '02).

(Continued)

*Primary Examiner*—Bhavesh M Mehta
*Assistant Examiner*—Bernard Krasnic

(57) ABSTRACT

A method for visual-based recognition of objects is described. Depth data for at least a pixel of an image of the object is received, the depth data comprising information relating to a distance from visual sensor to a portion of the object visible at the pixel. At least one plan-view image is generated based on the depth data. At least one plan-view template is extracted from the plan-view image. The plan-view template is processed by at least one classifier, wherein the classifiers are trained to make a decision according to pre-configured parameters.

40 Claims, 6 Drawing Sheets

OTHER PUBLICATIONS

Salvador Ruiz-Correa, et al.;"A New Pardigm for Recognizing 3-D Object Shapes From Range Data"; pp. 1-8; ICCV 2003 published in IEEE ICCV conference, Nice, France, Oct. 13-16, 2003.

Gregory Shakhnarivich, et al.; "Fast Pose Estimation With Parameter-Sensitive Hashing"; pp. 1-8; ICCV 2003 published in IEEE ICCV conference, Nice, France, Oct. 13-16, 2003.

Louis-Philippe Morency, et al.; "Pose Estimation Using 3D View-Based Eigenspaces"; published in IEEE International workshop on Analysis and Modeling of Faces and Gestures, Nice, France, Oct. 17, 2003.

"Image Understanding Workshop Proceedings of a Workshop held in Monterey, California"; Nov. 13-16, 1994, pp. 559-581 and 583.

Romer Rosales, et al. "Estimating 3D Body Pose Using Uncalibrated Cameras"; Published in IEEE CVPR conference, Dec. 2001.

N. Krahnstoever, et al.; "Automatic Acquisition and Initialization of Kinematic Models" pp. 1-5, Published in IEEE Conference on Computer Vision and Pattern Recognition, CVPR 2001, Kauaii, Hawaii, Dec. 2001.

Yoshio Iwai; "Posture Estimation Using Structure and Motion Models"; Published in IEEE ICCV Conference, Sep. 1999.

Michele Covell, et al.; "Articulated-Pose Estimation Using Brightness- and Depth-Constancy Constraints" Published in IEEE CVPR '00, Jun. 2000.

Nebojsa Jojic, et al.; "Tracking Self-Occluding Articulated Objects in Dense Disparity Maps"; Published in IEEE ICCV conference, Sep. 1999.

Michael H. Lin, et al.; "Tracking Articulated Objects in Real-Time Range Image Sequences"; Published in IEEE ICCV conference, Sep. 1999.

Ismail Haritaoglu, et al.; "Ghost: A Human Body Part Labeling System Using Silhouettes"; pp. 1-6; Published in 14th Inemational Conference on Pattern Recognition, Aug. 16-20, 1998, Brisbane, Australia.

Thad Starner, et al.; "Real-Time American Sign Language Recognition Using Desk and Wearable Computer Based Video"; pp. 1-2, 4-5 and 7; M.I.T. Media Laboratory Perceptual Computing Section Technical Report No. 466.

Shoichiro Iwasawa, et al.; "Real-Time Human Posture Estimation Using Monocular Thermal Images" pp. 492-497; Published in Third International Conference on Automatic Face and Gesture Recognition, Nora, Japan, Apr. 14-16, 1998.

* cited by examiner

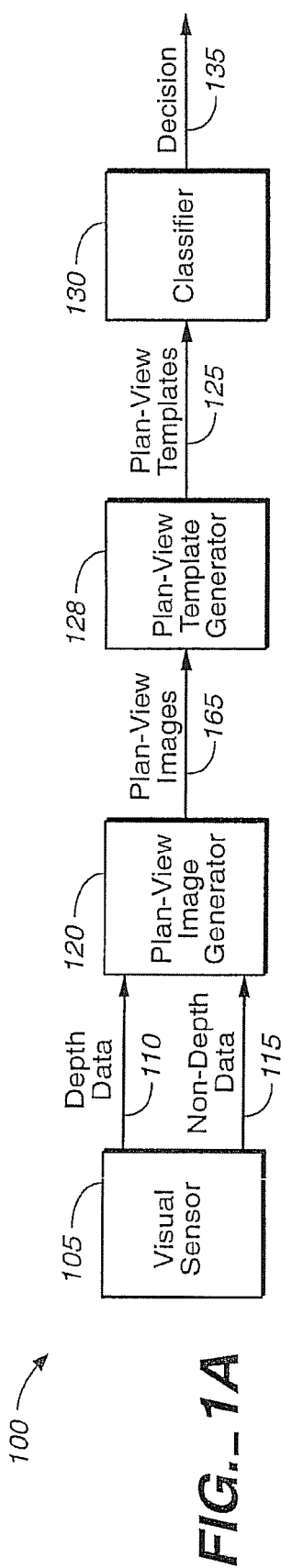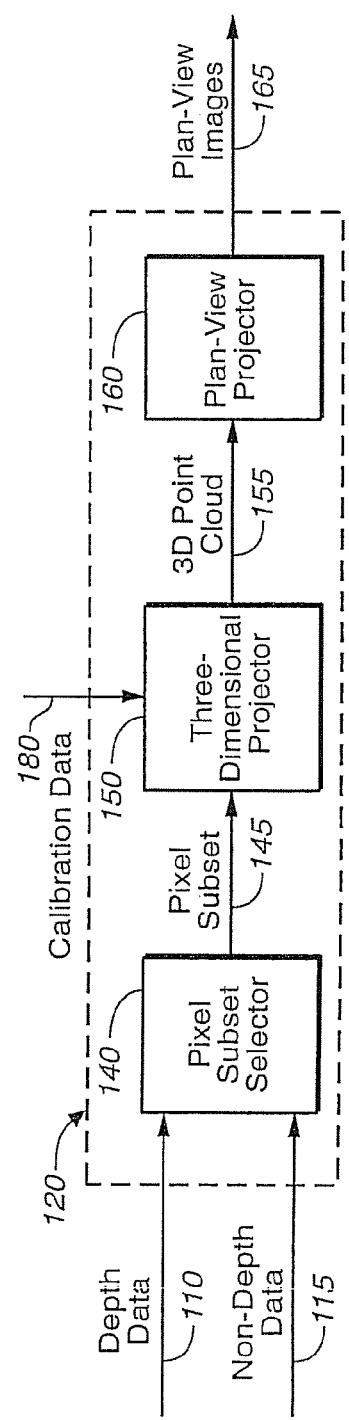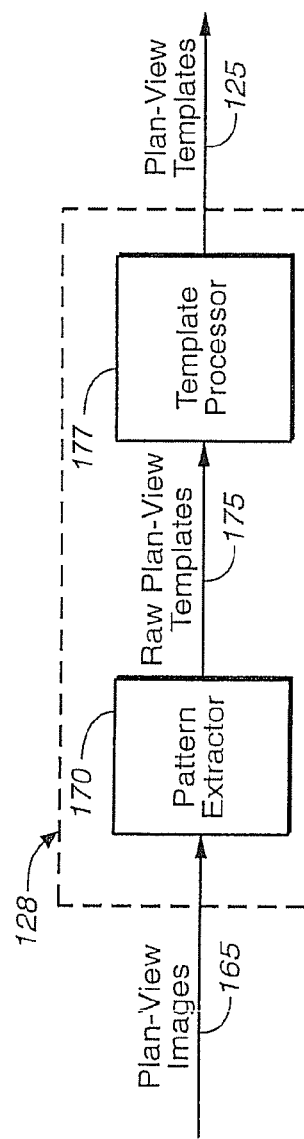

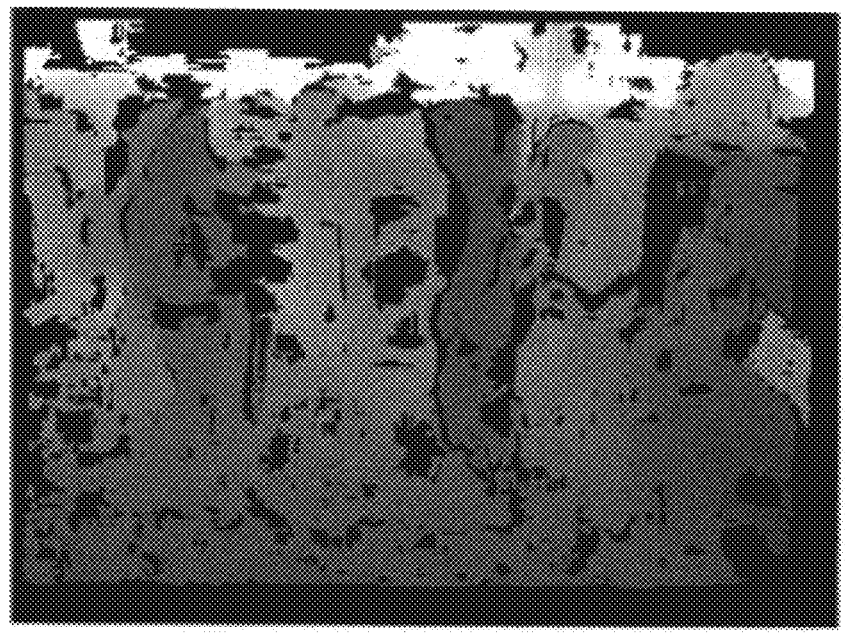
FIG._2A
FIG._2B

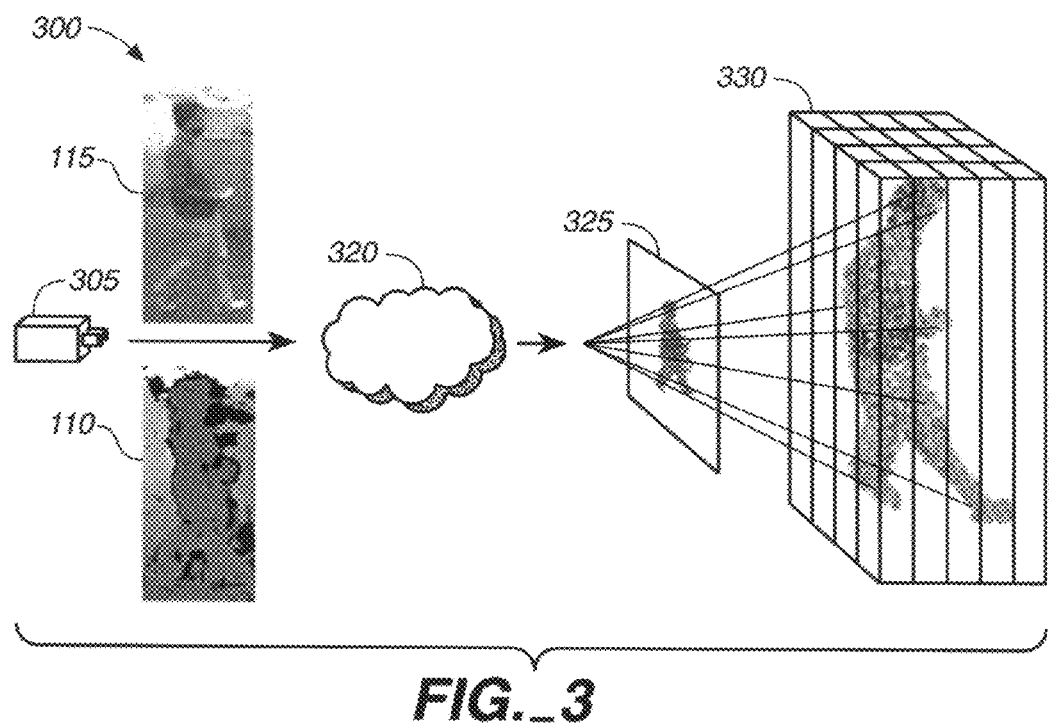
FIG._3
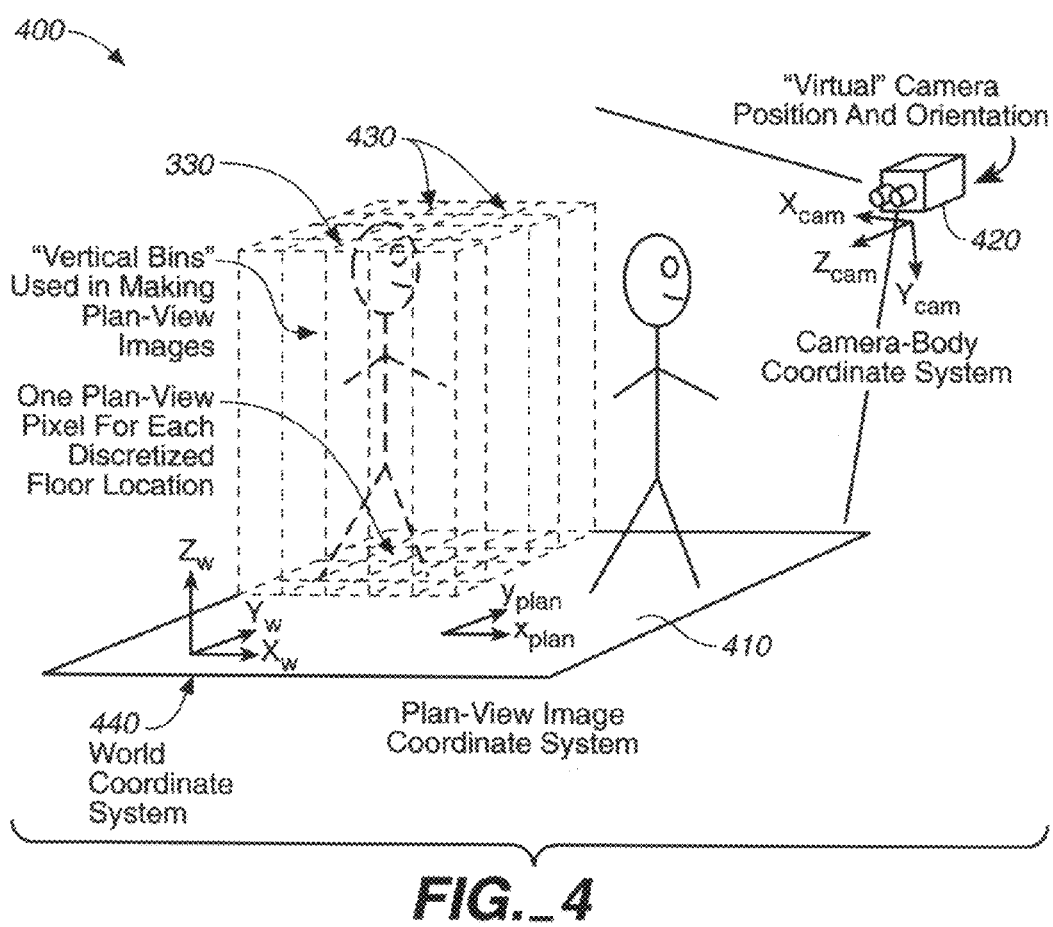
FIG._4

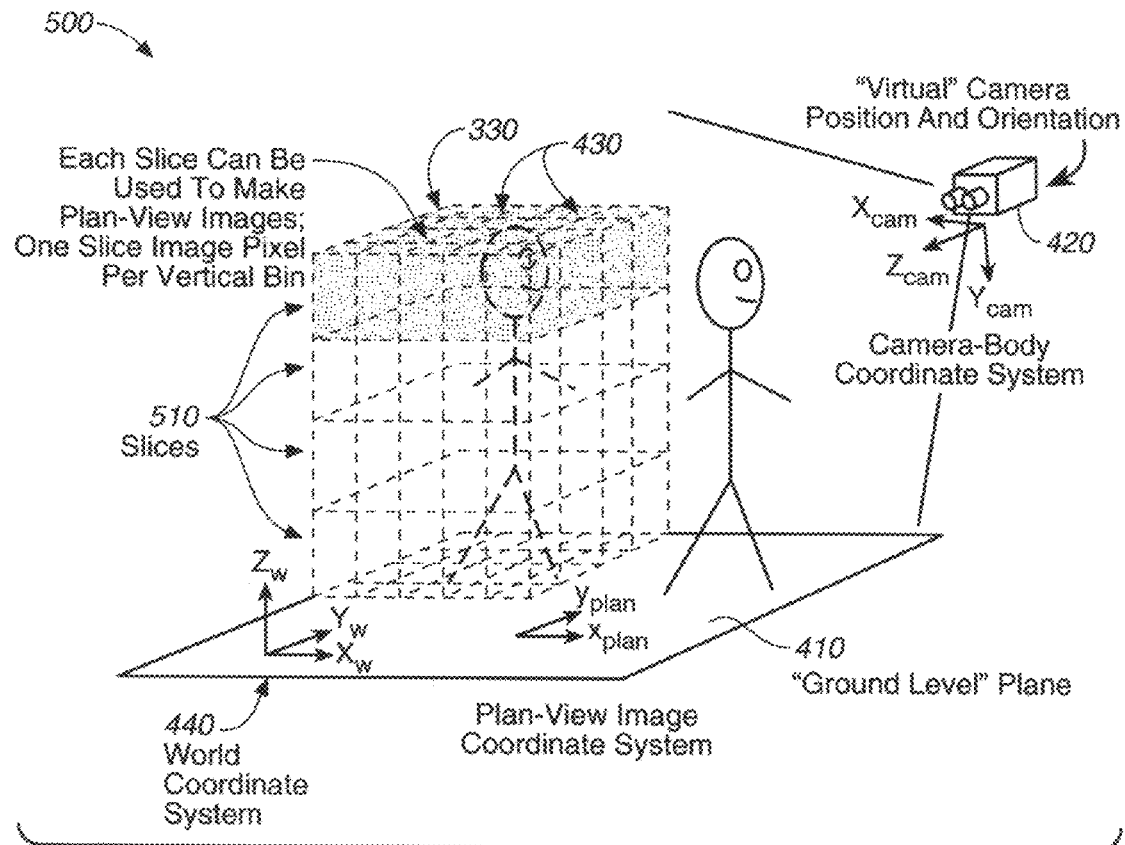
FIG._5
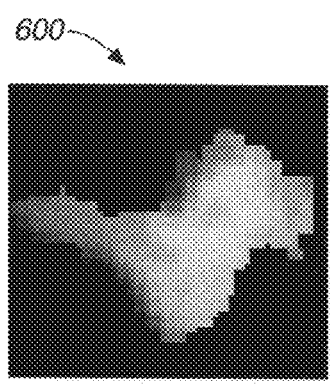
FIG._6A
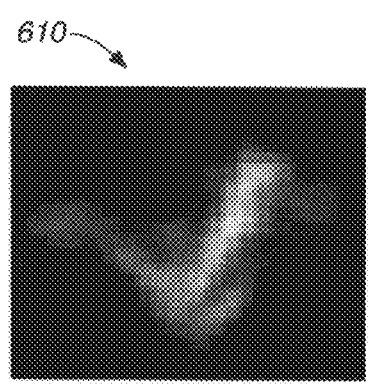
FIG._6B

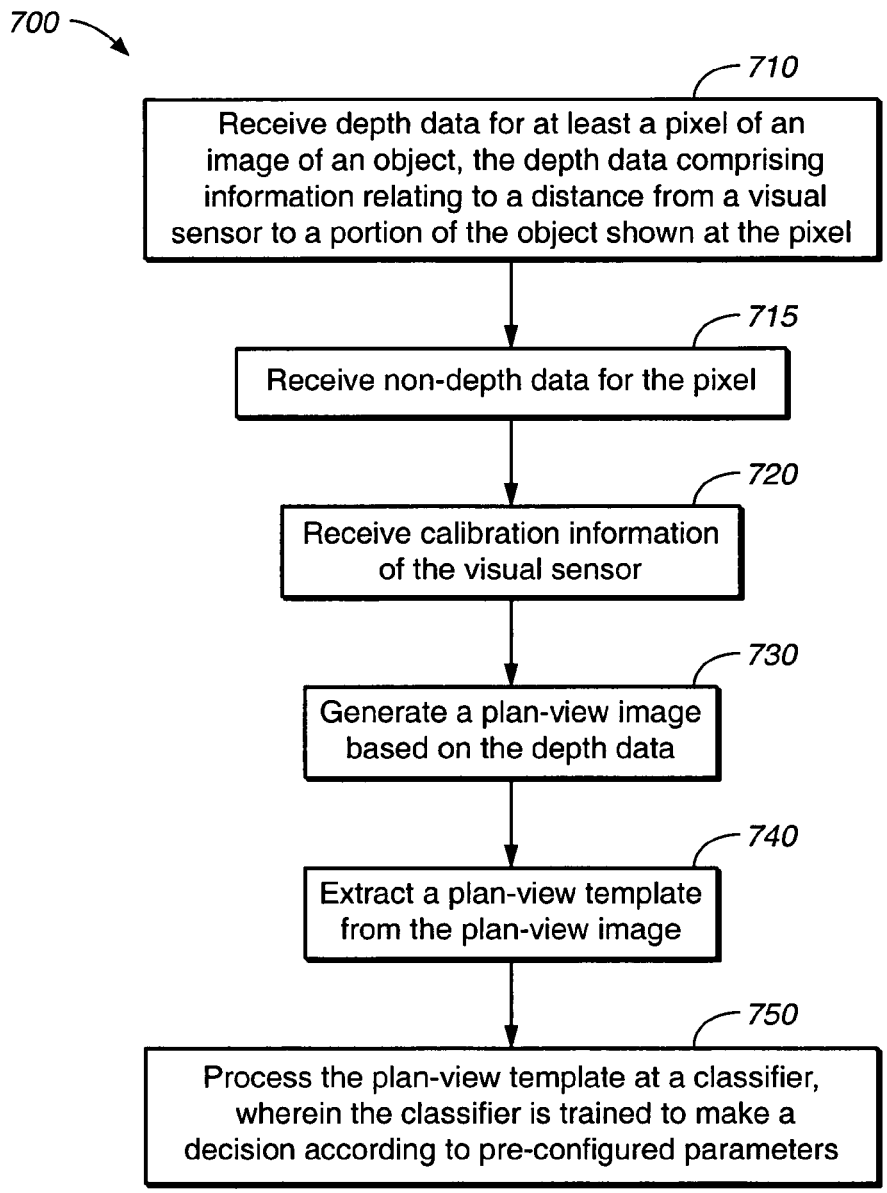
FIG._7

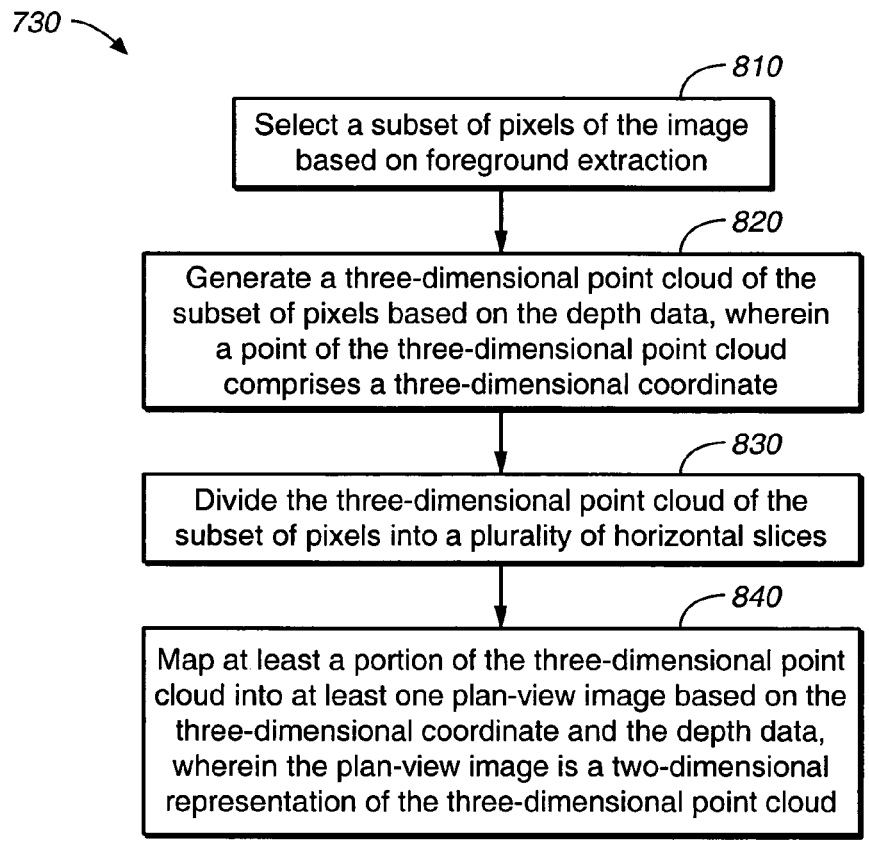
FIG._8
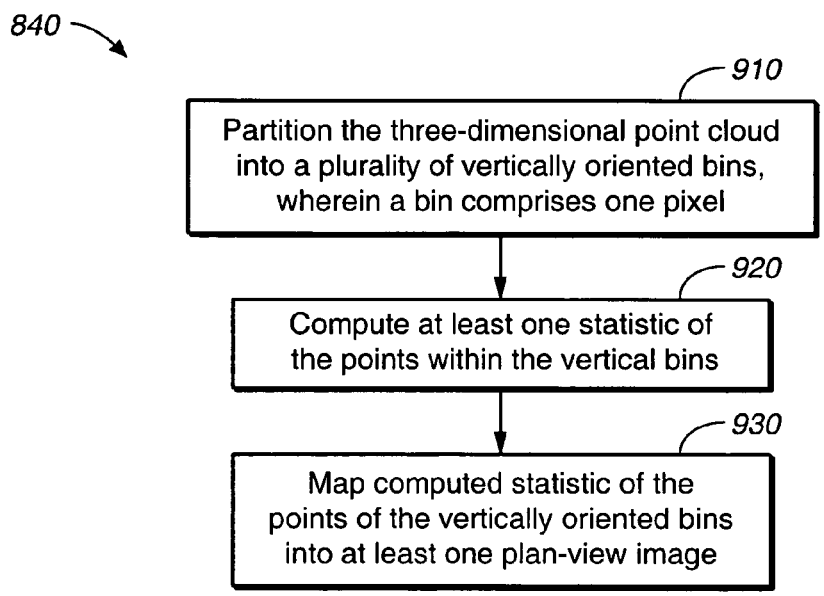
FIG._9

METHOD FOR VISUAL-BASED RECOGNITION OF AN OBJECT

TECHNICAL FIELD

Embodiments of the present invention relate to the field of object recognition. Specifically, embodiments of the present invention relate to a method and system for visual-based recognition of the type, identity, or configuration of an object.

BACKGROUND ART

The automated monitoring of the presence, location, and activities of people is a fundamental technology that enables many new, context-aware applications in domains ranging from "intelligent environments" to security and surveillance. Achievement of this via video cameras has the great appeal of not requiring any special behavior, awareness, or instrumentation of those being observed, while the cameras employed may be shared with other applications, such as teleconferencing, and may provide human observers with the means to record and verify the automated analysis. Currently, vision-based person and object perception is beset by many difficult challenges, including segmentation of people from the background, discrimination of people from other foreground objects, tracking of people through occlusions and close interactions, and modeling of the highly articulated human form.

One class of current camera-based methods for object recognition and pose recognition typically do not use explicitly computed depth data. As a result, these methods have great difficulty in separating objects from the scene background, in gauging the true physical size of the objects, and in determining accurate three-dimensional (3D) shape and orientation information about the objects. By attempting to implicitly obtain depth data, many object poses are more difficult to distinguish from each other in some camera views, and it is typically more difficult to construct recognition algorithms that are invariant to the location of the camera relative to the observed objects. Also, these methods tend to be highly error prone.

Furthermore, another class of current camera-based methods for object recognition attempts to match image data to 3D models. This class of methods relies on extensive computation based on the 3D models, attempting to fit data to these models and track parameters of these models over time. Such processes, particularly in the case of articulated, human bodies, are typically quite complex and noise sensitive, and therefore must employ extensive, often iterative calculations to avoid being highly error-prone. As a result, these methods are highly computational, requiring extensive computational resources, and are time consuming.

As described above, automated monitoring of people and objects is useful in many applications such as security and surveillance. For example, automated monitoring of customers may be relevant to retail store managers who might wish to improve the layout of their stores through a better understanding of shopper behavior. Currently, due to the shortcomings of the current classes of object recognition methods, retail stores often use employees or consultants to monitor shopper activity rather than automated monitoring. Human monitoring also has shortcomings, such as human error and the cost of employing additional personnel. Furthermore, in security applications it is typically necessary for automated monitoring to provide highly accurate and prompt analysis to provide maximum safety. However, due to the limitations of current automated monitoring methods, accuracy and/or prompt response time may not be provided, reducing the effectiveness and safety provided by current automated monitoring methods.

DISCLOSURE OF THE INVENTION

Various embodiments of the present invention, a method for visual-based recognition of an object, are described. Depth data for at least a pixel of an image of the object is received, the depth data comprising information relating to the distance from a visual sensor to a portion of the object shown at the pixel. At least one plan-view image is generated based on the depth data. At least one plan-view template is extracted from the plan-view image. The plan-view template is processed at a classifier, wherein the classifier is trained to make a decision according to preconfigured parameters.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1A illustrates a block diagram of a visual-based object recognition system in accordance with an embodiment of the present invention.

FIG. 1B illustrates a block diagram of a plan-view image generator in accordance with an embodiment of the present invention.

FIG. 1C illustrates a block diagram of a plan-view template generator in accordance with an embodiment of the present invention.

FIG. 2A illustrates an exemplary depth data image showing depth data of an exemplary image in accordance with an embodiment of the present invention.

FIG. 2B illustrates an exemplary color data image showing color data of an exemplary image in accordance with an embodiment of the present invention.

FIG. 3 illustrates a data flow diagram of a plan-view template generator in accordance with an embodiment of the present invention.

FIG. 4 illustrates a diagrammatic perspective view of a three-dimensional (3D) coordinate system, vertical spatial bins, and a three-dimensional point cloud for a visual scene in accordance with an embodiment of the present invention.

FIG. 5 illustrates a diagrammatic perspective view of the three-dimensional coordinate system of FIG. 4 with the vertical spatial bins and three-dimensional point cloud divided into multiple slices in accordance with an embodiment of the present invention.

FIG. 6A illustrates an exemplary plan-view template showing the maximum height for each vertical bin in accordance with an embodiment of the present invention.

FIG. 6B illustrates an exemplary plan-view template showing the occupancy (count of 3D points) for each vertical bin in accordance with an embodiment of the present invention.

FIG. 7 illustrates a flow chart of a process for visual-based recognition of an object in accordance with an embodiment of the present invention.

FIG. 8 illustrates a flow chart of a process for generating a plan-view image in accordance with an embodiment of the present invention.

FIG. 9 illustrates a flow chart of a process for mapping at least a portion of a three-dimensional point cloud into one or more plan-view images in accordance with an embodiment of the present invention.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be implemented in a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

The various embodiments of the present invention described in detail below provide methods and systems for recognition of the types, identities, poses, or configurations of objects. In accordance with these embodiments, persons and objects may be recognized, as well as poses of the persons and the objects. The following description covers a variety of systems and methods of recognizing objects, persons and poses in a visual scene using a time series of video frames representative of the visual scene.

FIG. 1A illustrates a block diagram of visual-based object recognition system 100 in accordance with one embodiment of the present invention. Visual-based object recognition system 100 comprises visual sensor 105, plan-view image generator 120, plan-view template generator 128, and classifier 130. It should be appreciated that visual-based object recognition system 100 may be implemented within a computer system.

Visual sensor 105 is operable to acquire a depth image including depth data 110 of a scene. Visual sensor 105 may comprise one or more emitters and sensors of electromagnetic radiation including but not limited to visible, infrared, or ultraviolet light. For purposes of the present application, a depth image is defined as including, at each pixel, a depth data value. A depth data value is a number relating to an estimate of the distance from visual sensor 105 to the portion of the scene visible at that pixel. It should be appreciated that the depth data can be determined for a group of pixels, in addition to a single pixel. It should also be appreciated that depth images may include disparity images. Depth images can be obtained by many methods, including methods based on correspondence-based multi-camera stereopsis (e.g., comparing images from two or more closely-spaced cameras), lidar, or structured light projection. In one embodiment, visual sensor 105 is a stereo camera implementing correspondence-based multi-camera stereopsis, in which images are received by two or more closely-spaced cameras, and in which image regions or features at a given location in an image obtained from one camera are compared to image regions or features along corresponding epipolar lines in images obtained by other cameras. Methods for correspondence-based stereopsis are well known in the arts of image processing and computer vision, and these methods typically produce "dense disparity" images that represent inverse distance from the cameras to points in a scene. The dense disparity images are straightforwardly converted, by well known methods, to dense depth images suitable for use in the invention described herein. All of these depth measurement methods are advantageous in many application contexts because they do not require the observed objects to be labeled or tagged, to behave in some specific manner, or to otherwise actively aid in the observation process in any way.

In some embodiments, visual sensor 105 is also operable to acquire non-depth data 115, such as color or luminance, associated with each pixel in the depth image. In these embodiments, the additional "non-depth" video streams (e.g., color or grayscale video) preferably are aligned in both space and time with the depth video. Specifically, the depth and non-depth streams preferably are approximately synchronized on a frame-by-frame basis, and each set of frames captured at a given time are taken from the same viewpoint, in the same direction, and with the non-depth frames' field of view being at least as large as that for the depth frame. Hence, the data produced by visual sensor 105 in these embodiments is imagery effectively containing depth data 110 in addition to some number of other non-depth data components 115 per pixel. It is often convenient to discuss and display the depth data 110 in an image separate from one or more images containing the other non-depth data 115, provided that there is temporal and per-pixel spatial registration between all of these images. FIGS. 2A and 2B show an example of a single frame of "depth-with-color" imagery, in which each pixel includes both a depth value and a 3-component color value.

FIG. 2A illustrates an exemplary depth image 200 showing depth data of an exemplary image in accordance with an embodiment of the present invention. In depth image 200, lighter values indicate greater distance from the camera, and black indicates unknown depth measurements. Similarly, FIG. 2B illustrates an exemplary color data image 210 showing color data of the exemplary image in accordance with an embodiment of the present invention. While color data image 210 is shown as a gray scale image, it should be appreciated that the 3-component color value for each pixel can be substituted for the gray scale value.

With reference to FIG. 1A, visual sensor 105 acquires depth data 110, and transmits depth data 110 to plan-view image generator 120. Optionally, visual sensor 105 acquires non-depth data 115, and transmits non-depth data 115 to plan-view image generator 120. In one embodiment, plan-view image generator 120 is operable to generate plan-view images 165 based on depth data 110. In another embodiment, plan-view image generator 120 is operable to generate plan-view images 165 based on depth data 110 and non-depth data 115.

FIG. 1B illustrates a block diagram of plan-view image generator 120 in accordance with one embodiment of the present invention. Plan-view image generator 120 comprises pixel subset selector 140, three-dimensional (3D) projector 150, and plan-view projector 160. It should be appreciated that plan-view image generator 120 may be implemented within a computer system. In conjunction with FIG. 1B, FIG. 3 illustrates a data flow diagram 300 of plan-view image generator 120 in accordance with an embodiment of the present invention. A detailed description of one embodiment of plan-view image generator 120 may be found in M. Harville, "Stereo person tracking with adaptive plan-view statistical templates", *Hewlett-Packard Laboratories Technical Report HPL*-2002-122, April 2002. Descriptions of related embodiments of plan-view image generator 120 may be found in U.S. patent application Ser. No. 10/133,151, entitled "Plan View Projections of Depth Image Data for Object Tracking," with filing date Apr. 26, 2002, invented by the inventor of the present application, and assigned to the assignee of the present application. A more general description of the components of plan-view image generator 120 is provided below.

Pixel subset selector 140 receives depth data 110 and, optionally, non-depth data 115 from visual sensor 305, and is operable to select a subset of pixels from the depth image, hereinafter referred to as pixel subset 145. In one embodiment of the invention, all pixels in depth data 110 are used. In another embodiment, all pixels in depth data 110 and an associated non-depth data 115 are used. In another embodiment of the invention, a subset of image pixels from depth data 110 and optional associated non-depth data 115 is chosen through a process of foreground segmentation, in which the novel or dynamic objects in the scene are detected and selected. It should be understood that foreground segmentation, also referred to as foreground extraction, background subtraction, background removal, or foreground/background segmentation, is well-known in the art, and that any method of foreground segmentation may be used in accordance with embodiments of the invention.

In some embodiments, the foreground segmentation method employed uses only depth data 110. In one such embodiment, foreground segmentation is done in part by selecting image pixels whose associated depth indicates that the corresponding 3D scene points are within a pre-determined 3D volume of interest. In another such embodiment in which foreground segmentation uses only depth data 110, foreground pixels are selected where the associated depth is less than the depth of the corresponding portion of a background model of the observed scene.

In other embodiments, the foreground segmentation method employed uses only non-depth data 115. For example, pixels may be labeled as foreground if their associated color differs, by some color difference measure, by more than a specified amount from that of the corresponding portion of a background model. In other embodiments, the foreground segmentation method employed uses both depth data 110 and non-depth data 115. In one such embodiment, the foreground segmentation method uses both color and depth data, and is described in M. Harville, "A framework for high-level feedback to adaptive, per-pixel, mixture-of-Gaussian background models," published in *Proceedings of the 7th European Conference on Computer Vision*, Copenhagen, Denmark, May 2002. For ease of understanding, the subset of pixels used by various embodiments of the present invention discussed below is referred to as the "foreground", even if this set contains all of the pixels in the original imagery. As shown in FIG. 3, foreground extraction 320 is performed on depth data 110 and non-depth data 115 resulting in foreground 325. In FIG. 3, non-depth data 115 is color image data.

Due in part to the substantial noise and regions of low-confidence data typical of real-time depth imagery, depth images may be transformed into new forms more suitable for particular perceptual tasks. In one embodiment, for person and object detection, the metric shape and location information inherent in the depth images is used to compute statistics of the scene as if it were observed by an overhead, orthographic camera. Because people typically do not overlap in the dimension normal to the ground, the resulting "plan-view" projections of the depth data allow people to be more easily separated and tracked than in the original "camera-view" depth images.

Pixel subset 145 is transmitted to 3D projector 150 for generating a 3D point cloud 155 of pixel subset 145 based on at least depth data 110. In one embodiment, each pixel of pixel subset 145 comprises a three-dimensional coordinate, and the three-dimensional point cloud represents a foreground surface visible to visual sensor 105. In one embodiment, every reliable depth image value can be back-projected, using visual sensor calibration data 180 and a perspective projection model, to its corresponding 3D scene point. In one embodiment, visual sensor calibration data 180 includes vertical and horizontal camera focal lengths, image pixel coordinates of the camera's center of projection, the location and orientation of different imaging elements of the visual sensor relative to that of a reference imaging element, and an indication of the visual sensor's location and orientation in some three-dimensional coordinate system. Back-projection of all foreground depth image pixels creates a 3D point cloud 155 representing the foreground surface visible to visual sensor 105. As shown in FIG. 3, depth data 110 of foreground 325, in conjunction with visual sensor calibration data 180, is used to generate 3D point cloud 330.

FIG. 4 illustrates a diagrammatic perspective view 400 of a three-dimensional (3D) coordinate system, vertical spatial bins, and a three-dimensional point cloud for a visual scene in accordance with an embodiment of the present invention. Initially, a three-dimensional point cloud 330 having members with one or more associated attributes obtained from the time series of video frames is generated. A 3D "world" coordinate system 440, spanned by X-, Y-, and Z-axes is defined. Plane 410 spanned by the X- and Y-axes is taken to represent "ground level." It should be understood that plane 410 need not physically exist; its definition is more akin to that of "sea level" in map-building contexts. In the case of recognition applications in room environments, it is convenient to define "ground level" to be the plane that best approximates the physical floor of the room. The Z-axis (e.g., vertical axis) is defined to be oriented normally to this ground level plane. In one embodiment, the position and orientation in the 3D world coordinate system 440 of the virtual camera 420 that is producing the depth and optional non-depth video is measured. It should be understood that virtual camera 420 may be comprised of visual sensor 105 of FIG. 1A, and that the term "virtual" is used here to describe the visual sensor because the video streams produced by it and used by the system may appear to have a camera center location and view orientation that does not equal that of any real, physical camera used in obtaining the data. The apparent viewpoint and orientation of virtual camera 420 may be produced by warping, interpolating, or otherwise transforming video obtained by one or more real cameras.

After the 3D coordinate system 440 has been defined, the 3D location of each of the subset of selected pixels is computed. This is done using the image coordinates of the pixel, the depth value of the pixel, the camera calibration information, and knowledge of the orientation and position of the virtual camera in the 3D coordinate system 440. This produces a 3D point cloud 330 representing the selected depth image pixels. If non-depth video streams also are being used, each point in the cloud is labeled with the non-depth image data from the pixel in each non-depth video stream that corresponds to the depth image pixel from which that point in the cloud was generated. For example, if color video is being used in conjunction with depth, each point in the cloud is labeled with the color at the color video pixel corresponding to the depth video pixel from which the point was generated.

The 3D point cloud is partitioned into bins 430 that are oriented vertically (along the Z-axis), normal to the ground level plane. Bins 430 typically intersect the ground level XY-plane 410 in a regular, rectangular pattern, but do not need to do so. The spatial extent of each bin 430 along the Z-dimension may be infinite, or it may be truncated to some range of interest for the objects being recognized. For instance, in person-recognizing applications, the Z-extent of the bins may begin at ground level and extend upward from there to a reasonable maximum height for human beings.

With reference to FIG. 1B, 3D point cloud 155 is transmitted to plan-view projector 160 for generating plan-view images 165 based on the three-dimensional coordinate and depth data 110, wherein plan-view images 165 are two-dimensional representations of three-dimensional point cloud 155. In one embodiment, each point in 3D point cloud 155 has an associated 3D coordinate, as well as any non-depth data 115, such as color, associated with the depth image pixel to which it corresponds. After the direction of the "vertical" axis of the world—that is, the axis normal to a ground level plane in which people and objects are expected to be well-separated—is determined, space may be discretized into vertically oriented bins (e.g., bins 430 of FIG. 4), and statistics of 3D point cloud 155 may be computed within each bin. Each of plan-view images 165 contains one pixel for each vertical bin, with the value at the pixel being some statistic of the 3D points within the corresponding bin.

It should be appreciated that different types of plan-view images are generated with different choices of the statistic to be computed for each vertical bin. The plan-view image types and statistics that may be used include, but are not limited to:

Occupancy maps: show the total number of 3D points in each vertical bin;
Height maps: show, for each vertical bin, a value representative of the height of one or more of the highest points in that bin;
Color maps: show, for each vertical bin, the average color of all 3D points in that bin;
Colored height maps: show, for each vertical bin, a color representative of that associated with one or more of the highest points in that bin;

Embodiments of the invention also allow for further discretization of space along the third, Z-dimension, as shown in FIG. 5. FIG. 5 illustrates a diagrammatic perspective view 500 of the three-dimensional coordinate system of FIG. 4 with the three-dimensional point cloud 330 and vertical bins 430 being divided horizontally into multiple slices in accordance with an embodiment of the present invention. Within 3D world coordinate system 440, each vertical bin 430 may be divided into several box-shaped sub-bins, by introducing dividing planes that are parallel to the ground-level plane. This creates two or more slices 510 of boxes, where the boxes in a particular slice 510 all have centers lying in some plane parallel to the ground-level plane. Plan-view images of any type can then be constructed, including all of the types discussed above, for one or more of these slices 510. Each plan-view image of a particular slice has one pixel per box in that slice image. One slice of boxes is highlighted in FIG. 5.

FIG. 1C illustrates a block diagram of plan-view template generator 128 in accordance with one embodiment of the present invention. Plan-view template generator 128 comprises pattern extractor 170 and template processor 177. It should be appreciated that plan-view template generator 128 may be implemented within a computer system.

With reference to FIG. 1C, pattern extractor 170 of visual-based recognition system 100 extracts raw plan-view templates 175 from plan-view images 165. Raw plan-view templates 175 are essentially sub-windows of the plan-view images 165, with some optional refinement to remove noise, normalize by some scale factor, apply other image transformations, or represent the data in a lower-dimensional form. However, it should be appreciated that a raw plan-view template 175 may be a plan-view image 165 (e.g., plan-view image 165 is not refined or modified).

For illustration, FIG. 6A illustrates an exemplary raw plan-view template 600 showing the maximum height for each vertical bin in accordance with an embodiment of the present invention. Furthermore, FIG. 6B illustrates an exemplary raw plan-view template 610 showing the occupancy for each vertical bin in accordance with an embodiment of the present invention.

The raw plan-view templates 175 may be extracted from plan-view images 165 by a wide range of means, including but not limited to:

Manual extraction: For example, a person may select one or more bounding boxes of interest within one or more plan-view images using a graphical interface tool;
Random extraction: Coordinates and dimensions of one or more sub-windows of the plan-view images are selected at random;
Exhaustive extraction: All possible windows within some range of window sizes and center coordinates are extracted;
Salience-based extraction: Windows may be extracted at plan-view image regions containing significant amounts of data, i.e. those locations for which many 3D points fall within the corresponding vertical bin or slice box; and
Tracking-based extraction: Locations of "interesting" patterns in the plan-view images, by some definition, are identified and tracked in sequences of plan-view images corresponding to different times, and templates are extracted at the estimated plan-view locations of the tracked objects. A detailed description of one embodiment of plan-view image generator 120 may be found in M. Harville, "Stereo person tracking with adaptive plan-view statistical templates", *Hewlett-Packard Laboratories Technical Report HPL*-2002-122, April 2002. Descriptions of a related embodiments of tracking-based extraction are described in U.S. patent application Ser. No. 10/133,151, entitled "Plan View Projections of Depth Image Data for Object Tracking," with filing date Apr. 26, 2002, invented by the inventor of the present application, and assigned to the assignee of the present application.

With reference to FIG. 1C, raw plan-view templates 175 are modified by template processor 177 to produce plan-view templates 125. It should be appreciated that template processor 177 is optional, and is not required for performing plan-view template generation 128. Template processor 177 may process raw plan-view templates 175 to produce new data representations embodied by plan-view templates 125. This processing may be include a combination of one or more of many types of data normalization and transformation, including but not limited to scaling in the spatial dimensions of the raw plan-view template, rotating the raw plan-view template image data, removal of small isolated regions of non-zero raw plan-view template data, smoothing of the raw plan-view template data, convolution of the raw plan-view template data with an image kernel, interpolation of the raw plan-view template data across small regions of zero or unreliable data, and representation of the raw plan-view template data in terms of contours, spatial moments, basis functions or vectors, or other primitives.

In some embodiments, template processor 177 applies height normalization to raw plan-view templates 175 containing height-related statistics. The height-related statistics may be of several types, including but not limited to a value representative of the height of one or more of the highest points in each bin, a value representative of the height of one or more of the lowest points in each bin, the average height of the points in each bin, the median height of the points in each bin, or some combination thereof. In one embodiment, normalization of the height-related statistics of a given raw plan-view template 175 is accomplished by first ordering all of the values in the raw template, then selecting the value with rank order at some pre-determined percentile (e.g. 90%), and finally dividing all template values by this selected value to produce corresponding new values. In other embodiments, height normalization is accomplished by dividing all height-related statistical values by the maximum of all such values. In yet other embodiments, height normalization is accomplished by dividing all height-related statistical values by the average of all such values.

In some embodiments, template processor 177 transforms the raw template data into a representation based at least in part on a vector basis. Given a set of N basis vectors for the plan-view templates, a particular plan-view template, with M data elements, is transformed by this basis by computing the dot product of the plan-view template with each of the N basis vectors, each of which also has M data elements, to produce N scalar coefficients. The set of N scalar coefficients forms a new representation of the plan-view template. This transformation may occur before or after other processing steps, such as height normalization, performed by template processor 177. In practice, N is selected to be less than M, so that although this new representation of the data is not as complete as the original, it may capture significant or interesting features of the input data in a more compact form that allows for faster and/or easier processing in subsequent computations. In some embodiments, each plan-view template 125 is comprised of N scalar coefficients in combination with normalizing factors and/or other factors obtained in other processing steps, such as height normalization, performed by template processor 177.

A suitable vector basis for the above-described transformation is obtained through principal component analysis (PCA) of plan-view templates in some embodiments of the invention. It should be appreciated that PCA is well understood in the field of image processing. In brief, PCA transformation of data begins with creation of a set of basis vectors from a set of training data. To accomplish this, each member of the set of training data is treated as a point in the space of all possible data of this kind. For the purposes of this invention, the training data is raw plan-view templates, and each is treated as a point in a space that has dimensionality equal to the number M of pixels in a plan-view template. PCA computes a mean vector of the points in this space, subtracts this mean from all of the points, and then computes the eigenvalues and eigenvectors associated with the mean-shifted points. The eigenvectors associated with some number N of the largest eigenvalues are selected as the PCA basis vectors. Given a set of N PCA basis vectors for the plan-view templates, a particular plan-view template is transformed by this basis by first subtracting the mean vector from it, and then computing the dot product of the plan-view template with each of the N PCA basis vector to produce N scalar coefficients. The set of N scalar coefficients forms a new representation of the plan-view template. In one embodiment, template processor 177 performs height normalization followed by transformation with a vector basis obtained through PCA on plan-view templates, to produce a new plan-view template representation comprising the N scalar coefficients and one normalizing height factor.

With reference to FIG. 5, for embodiments of the invention that construct plan-view images from more than one horizontal slice 510 of three-dimensional point cloud 330, plan-view templates 125 may be extracted from each of the horizontal slices. Plan-view templates 125 extracted from different slices but corresponding to similar locations in their respective plan-view images may be associated with each other in successive steps of the invention. In some embodiments, the associated templates are concatenated together to form a "multi-slice" template, containing data representative of plan-view images constructed from multiple horizontal slices.

With reference to FIG. 1A, plan-view templates 125 are then processed by one or more classifiers 130 to make decisions 135 about the type, identity, and/or pose of the object(s) corresponding to the data in the plan-view templates. Classifiers 130 may be binary (e.g., provide a "yes" or "no" answer), or multi-class (e.g., assigning the input to one of K classes, where K may be greater than 2). Each classifier decision 135 may be based upon input comprising one or more plan-view templates 125. When multiple templates are provided to a single classifier to make a single decision, these templates may be extracted from different portions of the same plan-view image, from different types of plan-view images created from depth data 110 and optional non-depth data 115 pertaining to a single time instance, from plan-view images created from different horizontal slices of the same three-dimensional point cloud of data, from plan-view images created from depth data 110 and optional non-depth data 115 obtained at different time instances, or some combination thereof.

In one embodiment, one or more classifiers 130 are operable to recognize many different types of body pose and activities via a single flexible, efficient framework based on classification of plan-view templates 125. For this invention, each plan-view template 125 may be considered to be a point in a space equal to the number of data components in the template. For example, if the template may be considered to be an image, it may also be treated as a point in space with dimensionality equal to the number of points in the image. Support vector machines are one type of classifier than can be implemented and can learn highly accurate and complex decision boundaries between multiple classes of labeled points in high-dimensional spaces. Types of classifiers that are well understood in fields such as pattern recognition, machine learning, and image processing, and that may be used in the invention, include, but are not limited to, the following:

Support vector machines;
Neural networks;
Linear or quadratic discriminant analysis;
K-Nearest-neighbor;
Hidden-Markov model (HMM);
Classification and Regression Trees (CART);
Multivariate Adaptive Regression Splines (MARS);

Clustering via K-means, learning vector quantization (LVQ), or Gaussian mixture modeling;

Probabilistic models and maximum likelihood calculations; and

Direct comparison with models, such as correlation with prototype templates.

Classifiers 130 are trained to make decisions according to pre-configured parameters. In one embodiment, each classifier 130 is provided a training data set comprising two or more classes of data. Each member of the training data set is comprised of a plan-view template 125 and a class label that indicates to which of said two or more classes this particular plan-view template belongs. For example, classifier 130 may be provided with a training data set comprised of 1) plan-view templates 125 labeled as belonging to a "reaching" class and obtained for people reaching for items, and 2) plan-view templates 125 labeled as "non-reaching" and obtained for people standing up straight and not reaching. Classifier 130 is operable to adjust its parameters iteratively during a training process, so as to learn to discriminate correctly between plan-view templates 125 belonging to different classes such as the "reaching" and "non-reaching" classes in this example. When presented with new plan-view templates 125 not used during training, a well-designed and well-trained classifier 130 will often succeed in correctly classifying the new template by using the classifier parameters obtained during training.

Examples of classes of data that may be discriminated by classifier 130 include, but are not limited to:

Discrimination between arm positions: For people standing upright in any orientation, detect reaching of an arm in any direction, as opposed to having arms in a relaxed position such at one's sides, in pockets, or folded across the chest;

Discrimination between body positions: For example, distinguish between standing upright, sitting, bending over, crouching, and arm reaching, without regard to overall body orientation (e.g., the direction the person is facing);

Discrimination between body orientations: For example, determine the direction an upright person's body is facing, choosing between the 8 categories of 0° (toward the camera), 45°, 90° (left), 135°, 180° (away from camera), 225°, 270° (right), and 315°;

Discrimination between different types of objects, such as cars, trucks, motorcycles, and bicycles;

Discrimination between different orientations, relative to the camera, of a particular type of object;

Discrimination between humans and non-human objects;

Discrimination between children and adults;

Discrimination between men and women;

Discrimination between two or more known individuals;

Discrimination between whether or not a particular object (e.g. a person) has been seen before (or recently) by the system;

Discrimination between the person behaviors of standing still and walking;

Discrimination between several different directions, relative to the camera, that someone is pointing toward with his or her arm.

More than one classifier can be applied to a given plan-view template in order to make multiple types of decisions. Also, decisions made on a set of plan-view templates, for example those collected over time and corresponding to a single tracked object, may be pooled to provide more robust classification. For instance, a simple voting technique may be used to assign the correct decision at a particular time to be the most frequent decision obtained over some set of templates obtained from a collection of video frames nearby to the time of interest. Pooling of decisions may also be done for input of the same plan-view template to different classifiers trained on the same decision task. In addition, many classifiers provide confidence measures on their decisions, and/or orderings of the preferability of each of the classes that might be selected. That is, in addition to providing the identity of the most likely class, the classifiers determine what the next most likely class is, what the third most likely class is, and so on, and/or provide some measure of confidence in these various assessments. This additional information can be used to further refine classification decisions, especially when pooling these decisions across multiple classifiers and/or multiple templates.

With reference to FIG. 5, for embodiments of the invention that construct plan-view images from more than one horizontal slice 510 of three-dimensional point cloud 330, data from more than one slice may provided to one or more classifiers. In some of these embodiments, plan-view templates 125 extracted from different horizontal slices are provided to separate classifiers to make independent classification decisions. In other embodiments, two or more templates obtained from a single classifier, or "multi-slice" templates containing data representative of plan-view images constructed from multiple horizontal slices, may be provided to a single classifier to make a decision. For example, if three horizontal slices are used, a plan-view template may be extracted from the same location in each corresponding plan-view image, and then the three templates can be concatenated into a single multi-slice template that is provided to a single classifier to make a decision. Alternatively, the three plan-view templates may be provided to three different classifiers that make independent decisions about the type, identity, or configuration of the object associated with the data.

FIGS. 7, 8 and 9 illustrate flow charts for use in processes 700, 800 and 900, respectively, for visual-based recognition of an object in accordance with embodiments of the present invention. In one embodiment, processes 700, 800 and 900 are carried out by processors and electrical components (e.g., a computer system) under the control of computer readable and computer executable instructions. Although specific steps are disclosed in processes 700, 800 and 900, such steps are exemplary. That is, the embodiments of the present invention are well suited to performing various other steps or variations of the steps recited in FIGS. 7, 8 and 9.

FIG. 7 illustrates a flow chart of a process 700 for visual-based recognition of an object in accordance with an embodiment of the present invention. In one embodiment, process 700 is implemented by a visual-based recognition system (e.g., visual-based recognition system 100 of FIG. 1A).

At step 710 of process 700, depth data for at least a pixel of an image of an object is received, wherein the depth data comprises information relating to estimates of the distances from a visual sensor to portions of the object visible at that pixel. In one embodiment, the visual sensor is a stereo camera. At step 715, non-depth data is optionally received from the visual sensor. The non-depth data is preferably aligned in both space and time with the depth data.

At step 720, calibration information of the visual sensor is received. In one embodiment, the calibration information includes vertical and horizontal visual sensor focal lengths, image pixel coordinates of the visual sensor's center of projection, the location and orientation of different imaging elements of the visual sensor relative to that of a reference imaging element, and an indication of the visual sensor's location and orientation. At step 730, a plan-view image is generated based on the depth data. In one embodiment, the plan-view image is generated according to a process described with reference to 730 of FIG. 8.

FIG. 8 illustrates a flow chart expanding on step 730 of FIG. 7 in accordance with an embodiment of the present invention. In one embodiment, step 730 is implemented by a plan-view image generator (e.g., plan-view image generator 120 of FIGS. 1A and 1B). At step 810, a subset of points of the image is selected. In one embodiment, the subset of points is selected according to foreground segmentation.

At step 820, a three-dimensional point cloud of the subset of points is generated based on the depth data and the optional non-depth data. In one embodiment, each point comprises a three-dimensional coordinate and associated optional non-depth data, and the three-dimensional point cloud represents a foreground surface visible to the visual sensor.

At step 830, the three-dimensional point cloud of the subset of points is divided into a plurality of horizontal slices, such that a plan-view image may be generated for at least one slice of the plurality of horizontal slices. It should be appreciated that step 830 is optional, and is not required for performing process 800. Dividing the three-dimensional point cloud into horizontal slices allows for generating plan-view images at different heights, thereby providing different information.

At step 840, at least a portion of the three-dimensional point cloud is mapped into at least one plan-view image based on the points' three-dimensional coordinates and optional associated non-depth data. The plan-view images provide two-dimensional representations of the three-dimensional point cloud. In one embodiment, the portion comprises at least one horizontal slice of the three-dimensional point cloud. In another embodiment, the portion comprises the entire three-dimensional point cloud. In one embodiment, a portion of the plan-view image is mapped according to a process described with reference to FIG. 9.

FIG. 9 illustrates a flow chart expanding on step 840 of FIG. 8 in accordance with an embodiment of the present invention. In one embodiment, step 840 is implemented by a plan-view projector (e.g., plan-view projector 160 of FIG. 1B). At step 910, the three-dimensional point space is partitioned into a plurality of vertically oriented bins. At step 920, one or more statistics of the points within each vertical bin are computed. If step 830 of FIG. 8 has been used to divide the three-dimensional space into horizontal slices, statistics may be computed separately for the portions of vertical bins lying in different horizontal slices. At step 930, each computed statistic of the points in the vertically oriented bins, optionally restricted to one or more horizontal slices, are mapped into corresponding plan-view images, wherein each pixel of a plan-view image corresponds to one of the vertical bins.

With reference to FIG. 7, at step 740, a plan-view template is extracted from the plan-view image. As described above, a wide range of extraction techniques may be used to extract the plan-view template, including but not limited to: manual extraction, random extraction, exhaustive extraction, and tracking-based extraction. In one embodiment the plan-view template is the plan-view image.

At step 750, the plan-view template is processed by one or more classifiers, wherein each classifier is trained to make a decision according to pre-configured parameters. In one embodiment, at least one of the classifiers is a support vector machine. As described above, the classifiers are used to make decisions as to the type, identity, and/or configuration of an object corresponding to the data in the plan-view template.

Embodiments of the invention rely on passive observation of a scene with a visual sensor (e.g., a camera) while not requiring special behavior on the part of the objects observed, not requiring the objects to be labeled with special marks or electronic devices, and not relying on the existence of unusual scene conditions (e.g., such as special illumination or specific markings on the floor or walls). Accordingly, embodiments of the present invention may be used in contexts where the participants may be unwilling, too busy, or otherwise unprepared for their observation. Furthermore, users need not be aware about the visual-based recognition system with which they are interacting, in that they do not need to remember to carry a "badge" or other sort of wireless transmitter, nor do they necessarily need to remember to behave in a certain way.

The projection of the depth data to plan-view images, and the subsequent extraction of plan-view templates, provide for improvements in both the speed and robustness of recognition algorithms for human body pose and activity as well as the identity, pose, and activities of other types of objects. In particular, once some types of classifiers are trained, they typically can make decisions on new data very rapidly. Without requiring extensive computation based on 3D models, and without attempting to fit data to these models and track parameters of these models over time, high-level questions about human body poses, for example, can be answered accurately despite bypassing the step of detailed analysis of human body pose.

Various embodiments of the present invention as described, use depth data and optional, associated non-depth data to generate plan-view images. Patterns of the plan-view images, or transformations thereof (e.g., plan-view templates), are classified to make decisions about object type, identity, orientation, or configuration. Embodiments of the present invention provide for building a wide-range of "context-aware", intelligent applications that respond to people based on what they are doing, rather than requiring these people to ask for services via more traditional computer interfaces. For example, a method and system are provided that recognize a person, determine the location of the person, determine which way the person is facing, determine whether the person is standing or sitting, and determine what the person is reaching for. The invention enables a response to this understanding in a manner that is desirable to the observed person, and therefore effectively enables communication with people via the "natural" interface of their own presence, activities, and gestures, rather than via artificial means such as a mouse and keyboard. The people have to think much less about the computer involved in the system and how to get it to do what they want, and therefore interaction is much more natural.

Embodiments of the present invention, a method for visual-based recognition of an object, are thus described. While the present invention has been described in particular embodiments, it should be appreciated that the present invention should not be construed as limited by such embodiments, but rather construed according to the following claims.

What is claimed is:

1. A method for visual-based recognition of an object, said method comprising:

receiving digital depth data for at least a pixel of an image of an object, which is not required to be inside of a subject, said depth data comprising information relating to a distance from a visual sensor to a portion of said object shown at said pixel, said visual sensor comprising an emitter and sensor of light, wherein said light is selected from the group of electromagnetic radiation consisting of visible light, infrared light, and ultraviolet light and wherein said receiving of said depth data does not require special behavior from one of said object and said subject;

generating a two dimensional plan-view image based in part on said depth data, wherein said generating includes generating said plan-view image as if said object was viewed at an axis normal to ground level from above and wherein generating other view images based on different orientations of said object other than at said axis normal to ground level from above is not required;

extracting a plan-view template from said plan-view image, wherein at least a portion of said plan-view image is transformed; and processing said plan-view template at a classifier, that is executing on a computer system, to assign a class to said plan-view template, wherein said classifier is trained to make a decision according to pre-configured parameters determined at least in part based on said class of said plan-view template.

2. The method as recited in claim 1 further comprising receiving non-depth data for said pixel.

3. The method as recited in claim 1 wherein said visual sensor determines said depth data using stereopsis based on image correspondences.

4. The method as recited in claim 1 wherein said generating said plan-view image comprises selecting a subset of said depth data based on foreground segmentation.

5. The method as recited in claim 1 wherein said generating said plan-view image further comprises:

generating a three-dimensional point cloud of a subset of pixels based on said depth data, wherein a point of said three-dimensional point cloud comprises a three-dimensional coordinate;

partitioning said three-dimensional point cloud into a plurality of vertically oriented bins; and mapping at least a portion of points of said plurality of vertically oriented bins into at least one said plan-view image based on said three-dimensional coordinates, wherein said plan-view image is a two-dimensional representation of said three-dimensional point cloud comprising at least one pixel corresponding to at least one vertically oriented bin of said plurality of vertically oriented bins.

6. The method as recited in claim 4 further comprising receiving non-depth data for said pixel, and wherein said foreground segmentation is based at least in part on said non-depth data.

7. The method as recited in claim 5 further comprising dividing said three-dimensional point cloud into a plurality of slices, and wherein said generating said plan-view image is performed for at least one slice of said plurality of slices.

8. The method as recited in claim 7 wherein said extracting a plan-view template from said plan-view image further comprises extracting a plan view template from at least two plan-view images corresponding to different slices of said plurality of slices, wherein said plan-view template comprises a transformation of at least said portion of said plan-view images, such that said plan-view template is processed at said classifier.

9. The method as recited in claim 1 wherein said extracting said plan-view template from said plan-view image is based at least in part on object tracking.

10. The method as recited in claim 1 wherein said classifier is a support vector machine.

11. The method as recited in claim 2 wherein said plan-view image is based in part on said non-depth data.

12. The method as recited in claim 1 wherein said object is a person.

13. The method as recited in claim 1 wherein said plan-view image comprises a value based at least in part on an estimate of height of a portion of said object above a surface.

14. The method as recited in claim 1 wherein said plan-view image comprises a value based at least in part on color data for a portion of said object.

15. The method as recited in claim 1 wherein said plan-view image comprises a value based at least in part on a count of pixels obtained by said visual sensor and associated with said object.

16. The method as recited in claim 1 wherein said plan-view template is represented in terms of a vector basis.

17. The method as recited in claim 16 wherein said vector basis is obtained through principal component analysis (PCA).

18. The method as recited in claim 13 further comprising performing height normalization on said plan-view template.

19. The method as recited in claim 1 wherein said decision is to distinguish between a human and a non-human.

20. The method as recited in claim 1 wherein said decision is to distinguish between a plurality of different human body orientations.

21. The method as recited in claim 1 wherein said decision is to distinguish between a plurality of different human body poses.

22. The method as recited in claim 1 wherein said decision is to distinguish between a plurality of different classes of people.

23. A visual-based recognition system comprising:

a visual sensor for capturing depth data for at least a pixel of an image of an object, which is not required to be inside of a subject, said depth data comprising information relating to a distance from said visual sensor to a portion of said object visible at said pixel, said visual sensor comprising an emitter and sensor of light, wherein said light is selected from the group of electromagnetic radiation consisting of visible light, infrared light, and ultraviolet light and wherein said capturing of said depth data does not require special behavior from one of said object and said subject;

a plan-view image generator for generating a two dimensional plan-view image based on said depth data, wherein said generating of said plan-view image includes generating said plan-view image as if said object was viewed at an axis normal to ground level from above and wherein generating other view images based on different orientations of said object other than at said axis normal to ground level from above is not required;

a plan-view template generator for generating a plan-view template based on said plan-view image; and a classifier for making a decision concerning recognition of said object, wherein said classifier is trained to make said decision according to pre-configured parameters that were determined at least in part based on a class assigned to said plan-view template.

24. The visual-based recognition system as recited in claim 23 wherein said visual sensor is also for capturing non-depth data.

25. The visual-based recognition system as recited in claim 23 wherein said visual sensor determines said depth data using stereopsis based on image correspondences.

26. The visual-based recognition system as recited in claim 23 wherein said plan-view image generator comprises a pixel subset selector for selecting a subset of pixels of said image, wherein said pixel subset selector is operable to select said subset of pixels based on foreground segmentation.

27. The visual-based recognition system as recited in claim 23 wherein said classifier is a support vector machine.

28. The visual-based recognition system as recited in claim 24 wherein said plan-view image is based in part on said non-depth data.

29. The visual-based recognition system as recited in claim 23 wherein said plan-view image generator is operable to generate a three-dimensional point cloud based on said depth data, wherein a point of said three-dimensional point cloud comprises a three-dimensional coordinate.

30. The visual-based recognition system as recited in claim 29 wherein said plan-view image generator is operable to divide said three-dimensional point cloud into a plurality of slices such that a plan-view image may be generated for at least one slice of said plurality of slices.

31. The visual-based recognition system as recited in claim 30 wherein said plan-view template generator is operable to extract a plan-view template from at least two plan-view images corresponding to different slices of said plurality of slices, wherein said plan-view template comprises a transformation of at least said portion of said plan-view images, such that said plan-view template is processed at said classifier.

32. A method for visual-based recognition of an object representative in an image, said method comprising:
    generating a three-dimensional point cloud based on digital depth data for at least a pixel of an image of said object, which is not required to be inside of a subject, said depth data comprising information relating to a distance from a visual sensor to a portion of said object visible at said pixel, said visual sensor comprising an emitter and sensor of light, wherein said light is selected from the group of electromagnetic radiation consisting of visible light, infrared light, and ultraviolet light, said three-dimensional point cloud representing a foreground surface visible to said visual sensor and wherein a pixel of said three-dimensional point cloud comprises a three-dimensional coordinate and wherein said generating of said three-dimensional point cloud does not require special behavior from one of said object and said subject;
    partitioning said three-dimensional point cloud into a plurality of vertically oriented bins;
    mapping at least a portion of points of said vertically oriented bins into at least one said plan-view image based on said three-dimensional coordinates, wherein said plan-view image is a two-dimensional representation of said three-dimensional point cloud comprising at least one pixel corresponding to at least one vertically oriented bin of said plurality of vertically oriented bins, wherein said mapping includes generating said plan-view image as if said object was viewed at an axis normal to ground level from above; and
    processing said plan-view image at a classifier, that is executing on a computer system, wherein said classifier is trained to make a decision according to pre-configured parameters and wherein said pre-configured parameters were determined based at least in part on a class assigned to a plan-view template that was extracted from said plan-view image by transforming at least a portion of said plan-view image, said classifier does not require other view images based on different orientations than at said axis normal to ground level from above of said object in order to make said decision.

33. The method as recited in claim 32 wherein said three-dimensional point cloud and said plan-view image are also based at least in part on non-depth data.

34. The method as recited in claim 32 wherein said visual sensor determines said depth data using stereopsis based on image correspondences.

35. The method as recited in claim 32 wherein said plan view template comprises a transformation of at least said portion of said plan view image, and such that said plan-view template is processed at said classifier.

36. The method as recited in claim 32 further comprising dividing said three-dimensional point cloud of into a plurality of slices, and wherein said mapping at least a portion of points comprises mapping points within a slice of said plurality of slices of said three-dimensional point cloud into said plan-view image.

37. The method as recited in claim 36 wherein said plan view template comprises a transformation of at least said portion of said plan view image, such that said plan-view template is processed at said classifier.

38. The method as recited in claim 32 wherein said classifier is a support vector machine.

39. The method as recited in claim 32 wherein said plan-view image is generated from a subset of pixels of said image selected based on foreground segmentation.

40. The method as recited in claim 36 further comprising extracting a plan view template from at least two plan view images corresponding to different slices of said plurality of slices, wherein said plan view template comprises a transformation of at least said portion of said plan view images, such that said plan-view template is processed at said classifier.

* * * * *

UNITED STATES PATENT AND TRADEMARK OFFICE
CERTIFICATE OF CORRECTION

| | | |
|---|---|---|
| PATENT NO. | : 7,831,087 B2 | |
| APPLICATION NO. | : 10/698111 | |
| DATED | : November 9, 2010 | |
| INVENTOR(S) | : Michael Harville | |

It is certified that error appears in the above-identified patent and that said Letters Patent is hereby corrected as shown below:

In column 13, line 2, after "to" delete "730 of".

Signed and Sealed this
Thirteenth Day of December, 2011

David J. Kappos
*Director of the United States Patent and Trademark Office*